Figure 1:
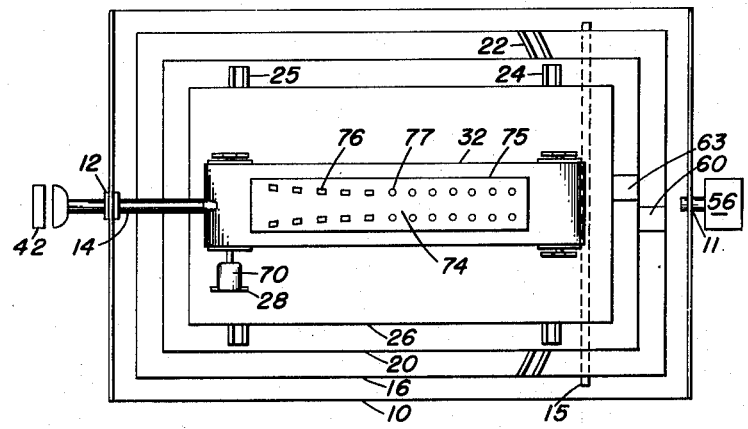

June 28, 1955  A. L. LEWIS ET AL  2,711,593
AIRFIELD LIGHTING SIMULATOR

Filed April 20, 1950  2 Sheets-Sheet 1

Inventors
AMOS L. LEWIS
FRANCIS C. BRECKENRIDGE

Inventors
AMOS L. LEWIS
FRANCIS C. BRECKENRIDGE

United States Patent Office 2,711,593
Patented June 28, 1955

2,711,593

AIRFIELD LIGHTING SIMULATOR

Amos Leo Lewis, Vienna, Va., and Francis Chapin Breckenridge, Washington, D. C.

Application April 20, 1950, Serial No. 157,152

24 Claims. (Cl. 35—12)

(Granted under Title 35, U. S. Code (1952), sec. 266)

This invention relates to a landscape or landing area lighting simulator such as an airfield simulator in which controls similar to those in an airplane cockpit for rudder, ailerons and the like may be used.

More particularly, the invention is directed to a scale model of a lighted airfield approachway and runway or taxiway, arranged in such a manner that the lighted landscape moves with relation to a cockpit, to give visual impressions of a pilot approaching, landing, or taxiing on a lighted field. The model is viewed through a monocular one to one ratio eye-piece. The speed of movement of the scale model is controlled to provide a close simulation of the movement of an aircraft in three dimensional space. The effects of poor visibility, variation in brightness of airfield lights, and cross winds are among those which may be determined.

Prior to the present improvements the methods used in the study of airfield lighting patterns are believed to be largely confined to drawing board plans, temporary installations at test stations, and permanent installations. Plans drawn on paper are obviously very inadequate for the study of these dimensional movements, cockpit cutoff, and variable visibility on the psychological and physical reactions of pilots.

Temporary and permanent installations are expensive, and the time, distance, and other elements involved make it entirely impractical to obtain sufficient data to base a complete or dependable evaluation of a single pattern, much less comparative and statistical evaluation of a number of patterns within a reasonable period of time.

The simulator of the present improvement has been determined to be invaluable in the analysis of the requirements of an approach and runway system based on known characteristics of electronic equipment, cockpit cutoff, pilots' requirements, physical and visibility limitations, and other pertinent considerations.

A most important test or evaluation of an airfield lighting system is the actual flight tests under low visibility conditions. These may, however, be reduced to a minimum by prior use of the present invention.

This reduction is of major importance as the number of actual test flights which can be made in a year is comparatively small. Also conditions such as daytime fog may seldom or never occur at a particular location. As it is to be expected that every pilot will experience this condition during his travel or duty, it is essential that he be trained to cope with it. It is estimated that the number of conditions which may be run under simulated conditions in a day is approximately equal to the number which might be run in a month under actual conditions. This assumes ideal weather conditions for testing.

According to the present improvements, there is provided a device simulating a landscape such as lighted approach and airfield. Only the landscape is preferably detachably secured as by tape to an endless movable belt so as to facilitate change of lighting pattern for the tests.

The belt is longitudinally movable so as to provide for motion relative to the fixed station during a simulated test, although it is contemplated that the pilot control station might be moved relatively to a fixed installation.

The simulator is equipped with dual controls, a master control for the controller or instructor who may preset the problem, or take control away from the pilot and a second set arranged as in the cockpit of an airplane for operation by the trainee or pilot.

The belt, aside from its longitudinal movement, will in response to either set of controls be moved approximately vertically upward and downward, as well as laterally and about a vertical axis. These movements are viewed through a telescope which is equipped with a shutter to wholly cut off the trainee's view or partially cut it off to a predetermined extent for the test. The telescope may include a controlled prism to relay to the trainee the effect of banking, but it is preferred that the structure which supports the belt be physically pivoted as will be more fully explained.

Assuming that the controller has set the problem and caused the shutter to be withdrawn, the trainee takes over. Fore and aft movement of the control stick simulates movement of an airplane's elevator surfaces through the altitude control. Bank or roll is produced by a sidewise motion of the control stick to simulate movement of aileron control surfaces. Movement of rudder surface is simulated by movement of the rudder pedals for yaw control.

Sidewise motion called drift is introduced by the aileron or rudder motions or by the controller.

The simulated movements are preferably obtained through the use of manually operable actuators controlling variable speed drives such as servo mechanisms. The several motions have separate actuators which control the movements of platforms or supports. The speed of the lateral movements of the simulated landscape is a function of the extent of movement of two or more manually operable actuators such as the aileron and rudder activators and banking mechanism.

An object of the invention is to provide a simulator device capable of setting up and reproducing controlled conditions, and of expeditiously changing from one lighting pattern to another for the statistical analysis or evaluation of the relative effectiveness of various patterns of approach and runway lights for guiding a pilot to a landing, particularly during conditions of poor visibility.

Another object is to provide a simulator device for the evaluation of taxiway lighting systems.

Another object is to provide a device for training pilots in the purpose and use of airfield or landing lighting systems during conditions of low visibility.

Another object is to provide a simulator with dual controls, one for the pilot, and one for the controller or instructor who may preset the problem and then cut in the pilot for the simulated approach and landing.

Another object is to provide a landscape simulator having controls to which parts of the simulator will respond in size and velocity ratios which are proportional to or a function of those encountered in actual flight.

Another object is to provide a device for simulating an observer moving over a landscape.

Another object is to provide a device for simulating the visual sensations of an observer moving over a landscape in which cockpit cutoff and/or the other changes occurring during flight, approach and landing are simulated when viewed through a properly positioned optical system.

Figure 2:
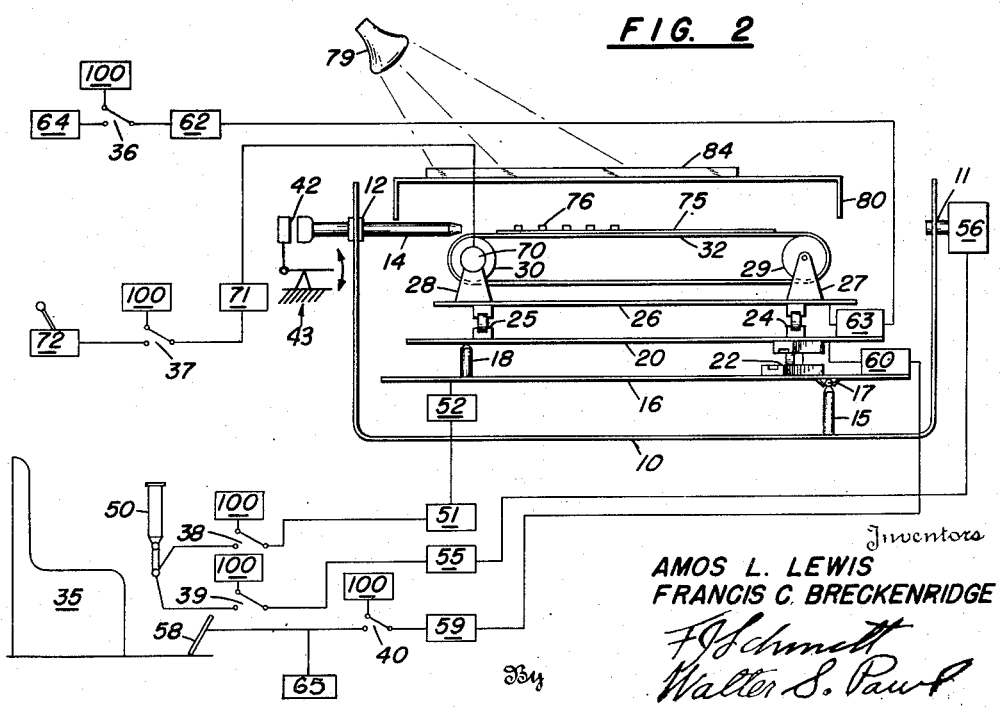
Figure 3:
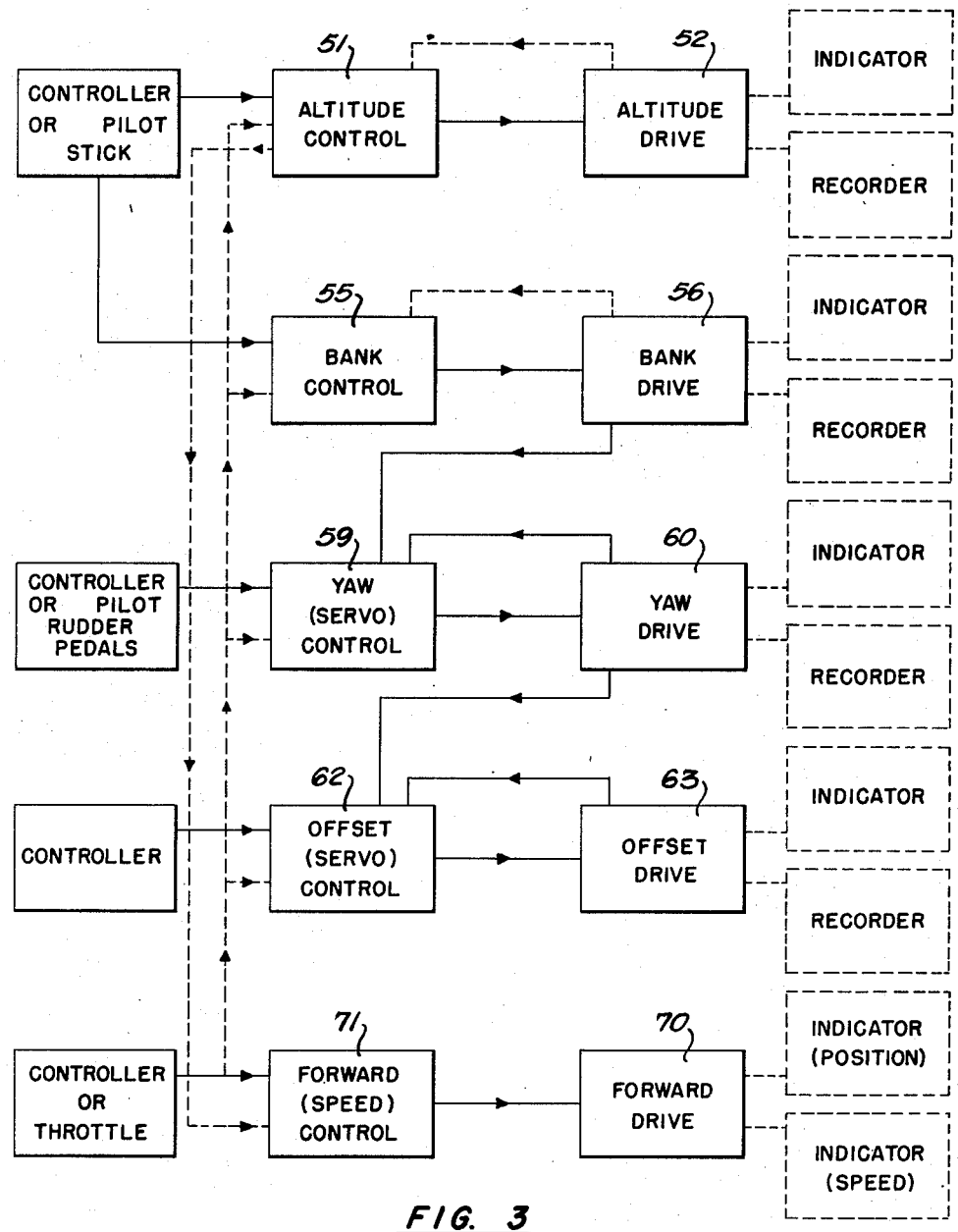

These and other objects of invention will be manifest from a consideration of this description, appended claims and drawings in which:

Fig. 1 is a diagrammatic top view of certain portions of the simulator including those which support and move the belt, Fig. 2 is a diagrammatic side elevational view showing the structure of Fig. 1 and control mechanism, Fig. 3 is a block diagram of a set of dual controls with recording and indicator take-offs from the several drives.

Referring to the drawings, Figs. 1 and 2 show a cradle like support 10 pivoted at 11 and 12 which are aligned with the axis of box telescope 14. A transverse member 15, secured to the cradle support at a point longitudinally removed from the telescope 14 provides a horizontal pivot 17 about which the platform 16 may be rotated for simulating increases and decreases in altitude.

Projecting vertically upward from the platform 16 is a pivot 18 about which a second platform 20 moves, as shown, on roller tracks 22. These tracks are curved about 18 as a center. The platform 20 has two sets of roller tracks 24, 25 which guide the platform 26 for lateral movement. Fixed for movement with platform 26, are the supports 27, 28 for rolls 29, 30 on which the belt 32 moves.

The telescope 14 remains fixed in horizontal position at all times. Its front end is forwardly of the upper reach of the belt 32 and the relative positions of the telescope and belt after a simulated landing is approximately as shown in Fig. 2. It will be seen that as the belt is elevated just prior to the simulated landing that the actual visual effect of a landing will be substantially reproduced.

The belt 32 and the above described platforms when made responsive to controls will reproduce for the trainee pilot the relative positions occurring in an actual landing. The controls and drives are such that the changes take place at a ratio which is proportional to those occurring under flight conditions.

As stated, dual controls are provided. The pilot controls are preferably located in a cockpit of conventional design with the telescope 14 positioned for convenient viewing by a trainee seated at 35. Operation of the pilot's controls and drives is as follows.

Assuming the controller or instructor has cut the pilot in by closing switches 36, 37, 38, 39 and 40 and adjusting the shutter 42 by the adjusting linkage schematically shown by 43 on the optical device 14, fore and aft movement of the activator stick 50 activates the altitude control 51 and altitude drive 52 to rotate platform 16 about pivot 17 to give the sensation of altitude change to the pilot. The extent of movement of the activator stick 50 determines the rate of altitude change.

Simply stated, movement of the activator for the several controls and drives function similarly to a mechanical cone belt drive arrangement where the extent of movement of the activator corresponds to the belt's movement to the cone and a distance over the cone, or to a rheostat motor combination. No invention is claimed herein on details of a particular driving device as a number are suitable for the purposes of the invention.

Bank or roll motion is similarly produced in an amount under control of the pilot by sidewise motion of the stick 50, simulating movement of the aircraft aileron control surfaces through bank control 55 and bank drive 56 which causes cradle 10 to pivot about the axis on the line of sight as previously mentioned and to a rate which is proportional to or a function of the extent of sidewise motion of the stick 50. When bank is simulated, platform 26 is prevented from rolling down tracks 24 and 25 by drive 63.

Yaw motion is similarly produced in an amount under control of the pilot by the motion of the rudder pedals 58 and/or bank motion diagrammatically indicated at 65 through control 59 and drive 60 causing table 20 to pivot about 18 at a rate determined by the extent of movement of the rudder pedals and/or bank movement. Alternatively, yaw motion may be introduced by controller 100. This simulates the movement of rudder surface and/or accomplished bank movement of the airplane.

Sidewise motion of an airplane called drift is introduced by the aileron and/or rudder motions through the yaw motion diagrammatically indicated at 64 or by the controller 100. It is produced by the offset control 62 and offset drive 63 causing platform 26 to move transversely and to be guided by roller tracks 24, 25. The rate of movement like all the others is a function of the extent of movement.

Forward motion of the belt or apron 32 is produced by motor or other drive 70 through control 71 connected thereto. It is activated by the throttle activator 72. Each of the instructors' controls 100 shown in Fig. 2 are similar to those of the pilot to permit dual activation of the various controls and drives mentioned above and may be conveniently positioned so that the instructor can preset a problem or correct errors made by the pilot. In addition, controls 100 include conventional switching means for actuating switches 36, 37, 38, 39 and 40 to connect and disconnect the pilot's controls. Thus, the pilot has no control when the instructor is operating the device.

Any of several conventional control and drive mechanisms (not shown) may be used to operate the platforms. Each of the controls 51, 55, 59, 62 and 71, and each of the drives 52, 56, 60, 63 and 70, may be electrical, mechanical, hydraulic, pneumatic, or suitable systems of servo mechanisms of the type known per se. For example, each of the various controls mentioned above may comprise a center-tapped potentiometer for energizing the conventional respective drives which may comprise variable speed reversible servo motor sets, each driving a drum which moves a platform by means of a flexible, non-extensible steel cable.

Suitable stops, not shown, are used to prevent damage to the machine which might result from overrunning the operative range of the apparatus.

It may be noted that the device as described does not have a pitch motion i. e., rotation of the aircraft about a transverse horizontal axis. This may be introduced by an additional control and drive to rotate the entire assembly of platforms about a transverse axis horizontal with respect to the object lens, or it may be simulated optically as hereinafter described.

Referring to Fig. 1 the bolt 32 supports a detachable pattern 74 secured as by a tacky type of removable tape 75. The pattern shown includes converging and projecting simulated approachway lights 76 and simulated flat lights 77 on the simulated airfield or taxiway. The projections and a flat portion of the pattern are carefully painted to scale with fluorescent paint to accurately simulate an airfield. A source of ultraviolet light 79 is fixed in position above the belt to activate the fluorescent paint. The pattern when viewed through the one-to-one ratio tank-type-monocular telescope 14 gives a strikingly close approximation of the appearance of an airfield lighting system during an approach and landing operation.

A fixed support 80, Fig. 2, extends upwardly beyond the belt 32. This support has two longitudinal sides and is open at the top. It may support a fog simulator 84 such as translucent paper which will reduce the "brightness" of the simulated lights by being positioned between the light 79 and the belt 32. The fog simulator 84 may have different degrees of translucency and be made of different materials and constructions the requirement being that it reduce the lighting effect to some predetermined condition such as daytime fog.

As will be understood, the support 80 is cut away and shaped to permit proper positioning of other parts and is susceptible to convenient fixed mounting.

After presetting the problem by setting the altitude; lateral displacement or drift and other conditions as desired and cutting in the pilot, the controller may, by instruments which visually indicate and permanently record, watch the pilot's handling of the particular problem. The instruments may be any of a number of suitable types and the preserved record may conveniently be a paper record.

The recording instruments and indicators are connected to the several variable speed drives as indicated in the block diagram Fig. 3. As previously indicated the offset drive may be omitted from the cockpit controls and be used only in the presetting.

A device using electrical servo controls and drives arranged as generally depicted in Fig. 3 has clearly demonstrated that close approximations of pilot's visual sensations may be obtained by his manual activation of the platform assembly shown in Figs. 1 and 2.

The nature of the effects of the different controls will be readily seen from Fig. 3 in conjunction with the above description and known operation of servo devices. The variable speed drives and their manually operable activating controls operate the several platforms in a manner which when viewed through the optical piece 14 give the visual sensations occurring in a landing operation. Considering the belt as being at normal position when its center is aligned with the line of sight of the telescope 14, the belt during operation is moved laterally at a velocity which is a function of the angular displacement of its center line. A device using so much of the apparatus shown in full lines, Fig. 3, has proved practical. The dotted line interconnections may be added.

It is to be noted that portions of any individual pattern may be covered with opaque material to provide different lighting conditions, and that the relative position of the pattern on the moving belt and the light 79 simulates the increasing intensity which will be experienced under flight conditions.

The one-to-one ratio telescope 14 is used in the simulation of different cockpits by adjusting shutter 42. Shutter 42 has the contour of the desired cockpit cutoff. When the shutter is in the normal position, the forward view of the observer is the same as that of the cockpit of the simulated aircraft. The shutter may be moved to a second position to provide an entire forward cutoff and to an intermediate position to introduce simulated pitch of the aircraft.

As will be seen from Fig. 2 the member 15 is near the forward end of the platform 16. The result is that that portion of the belt 32 which is near the object lens of the telescope 14 approximates vertical movement in simulating the changes in altitude. This is the portion of the belt in the line of sight just prior to landing. A vertical motion might be substituted but the illustrated embodiment is preferred because of its simplicity and effectiveness in the combination. The motion produced will sometimes be referred to as vertical.

From the above description, it will be seen that each pilot can make a simulated approach from each predetermined location in any order of sequence chosen by the controller. The unit is compact, a belt 10 inches wide, mounted on two four inch rollers spaced approximately 3½ feet between centers being illustrative of size of parts.

It is obvious that changes may be made without departing from the scope of the present improvements. For example, conveyors other than an endless belt might be used and certain advantages of the invention with landscapes other than lighted airfields may be had although it is peculiarly well suited as a landing training aid as above explained.

Similarly while the fluorescent illuminating means have been found to be particularly effective in conjunction with varying the visibility conditions, the invention contemplates within its broader scope the use of reflectors such as glass or metallic mirrors suitably shaped, or the use of lights carried by the conveyor or belt. All or part of the light producing pattern may be detachably mounted or suitably masked.

It may be noted that the vertical pivot 18, the point of furtherest advance of the belt 32, and the object lens of the telescope 14 are in near vertical alignment so that pivotal movement of the landscape as involved in simulating turning will be accurately transmitted to the pilot or viewer.

It is desired that the invention not be limited to the described embodiment but only by the scope of the appended claims.

The invention described herein may be manufactured and used by or for the Government of the United States of America for governmental purposes without the payment of any royalties thereon or therefor.

What is claimed is:

1. In an airfield lighting simulator, a movable endless belt, a fluorescent coating pattern arranged on said belt to simulate airfield lights, a source of ultraviolet light, a support, light modifying material positioned on said support between the source of ultraviolet light and the pattern arranged on the movable endless belt.

2. The combination of claim 1 further defined in that the pattern is detachably mounted on said endless belt.

3. In combination for use in a pilot training device, means for simulating a landscape, an endless belt supporting said landscape simulating means, means for advancing said belt along its longitudinal axis, means for bodily moving said belt laterally, means for bodily raising and lowering said belt approximately vertically, means for bodily moving said belt about a vertical axis, optical viewing means for the said landscape, and means for causing the simulated landscape to be moved about the longitudinal axis of said optical means.

4. In combination for use in an airfield landing simulator, three relatively movable superposed cooperating platforms, a movable endless belt, supporting means for the said belt, said supporting means being secured for movement with the top platform, variable speed means for elevating or lowering all of the platforms and the support simultaneously, variable speed drive means for laterally moving a second platform, and variable speed means for pivotally moving the third platform about a vertical axis which is in approximate alignment with the forward point of advance of the movable endless belt.

5. The combination of claim 4 further defined in that an optical viewing system is provided, said optical system having an object lens in approximate alignment with the forward point of advance of the movable endless belt.

6. The combination of claim 5 further defined in that means are provided for supporting the three platforms for pivotal movement about the longitudinal axis of the optical viewing system together with variable speed driving means for causing said pivotal movement.

7. The combination of claim 6 further defined in that manually operable activating means are provided for each of the variable speed driving means and that the extent of manual movement of the activating means causes a proportional speed change in the variable speed means.

8. In a device for simulating the visual sensations of an observer moving over a landscape at changing altitudes, a horizontally mounted endless belt, and a plurality of motive means operatively connected to said belt for movement thereof in directions longitudinally, laterally, vertically and about a vertical axis with respect to its longitudinal axis.

9. The combination of claim 8 further defined in that interconnected manually operable activating means, control means and driving means are included in one of the motive means and that the extent of manual movement of the activating means causes a proportional speed change in the vertical upward and downward movement of the belt.

10. The combination of claim 8 further defined in that an angularly displaceable cockpit stick is included in said motive means and operatively connected to said belt for manually controlling the speed of vertical movement of the belt by movement in one direction and the speed of lateral movement of the belt by movement in another direction, said stick movements being proportional in size to the speed of said vertical and lateral movements of the belt.

11. The combination of claim 8 further defined in that one of said motive means includes two different manually controlled activators for moving the belt laterally, the speed of movement of the belt being a function of the extent of movement of either activator.

12. The combination of claim 8 further defined in that dual sets of controls are connected to said motive means including a master control set and a secondary control set, said master control set including means for presetting the position of the landscape simulating means.

13. The combination of claim 12 further defined in that an optical viewing system for an operator of the secondary control set is positioned adjacent to said belt and is trained thereon, said optical system having an adjustable cutoff to vary the field of vision.

14. In combination for use in a pilot training device, means for simulating a landscape, a horizontal endless belt for supporting said means, means for advancing said belt along its longitudinal axis, variable speed drive means for bodily moving said belt laterally with respect to said axis, variable speed drive means for bodily raising and lowering said belt approximately vertically, and variable speed drive means for bodily moving said belt about a vertical axis, optical viewing means positioned close to the forward end of horizontal travel of the belt, and manually operable activating means for each of the variable speed drive means, said variable speed drive means being operable at rates which are a function of the extent of movement of the manually operable means.

15. The combination of claim 14 further defined in that the said optical means has a cutoff which is adjustable to simulate the view from various airplane cockpits at different altitudes in a landing operation.

16. In combination for use in a pilot training device, means for simulating a landscape, a horizontal endless belt supporting said landscape simulating means, means for advancing said belt along its longitudinal axis, means for bodily moving said belt laterally with respect to said axis, means for bodily raising and lowering said belt approximately vertically, means for bodily moving said belt about a vertical axis.

17. The combination of claim 16 further defined in that a belt viewing optical system is positioned near the limit of longitudinal advance of said belt.

18. The combination of claim 16 further defined by a fluorescent coating pattern arranged on said belt to simulate landscape lights, and means for activating said fluorescent material.

19. In combination for use in a pilot training device, means for simulating a landscape, a conveyor supporting said landscape simulating means, means for advancing said conveyor along its longitudinal axis, means for bodily moving said conveyor laterally, means for bodily raising and lowering said conveyor approximately vertically, means for bodily moving said conveyor about a vertical axis, optical viewing means for the said landscape, and means for causing the simulated landscape to be moved about the longitudinal axis of said optical means.

20. In combination for use in a pilot training device, means for simulating a landscape, an endless belt supporting said landscape simulating means, means for advancing said belt along its longitudinal axis, means for bodily moving said belt laterally, means for bodily raising and lowering said belt approximately vertically, means for bodily moving said belt about a vertical axis, viewing means for said landscape, and means operatively associated with said viewing means for simulating movement of said landscape about the longitudinal axis of said viewing means.

21. The combination of claim 3 further defined by a fluorescent coating pattern arranged on said belt to simulate airfield lights, a source of ultraviolet light, a support, and light modifying material positioned on said support between the source of light and the pattern.

22. The combination of claim 3 further defined in that the object lens is positioned adjacent to the forward end of said belt when the belt has been raised to its upper most position.

23. The combination of claim 3 further defined in that said optical means has a cutoff which is adjustable to vary the field of vision.

24. The combination of claim 19 further defined by illuminating means attached to said landscape simulating means.

References Cited in the file of this patent

UNITED STATES PATENTS

| | | |
|---|---|---|
| 1,393,456 | Ruggles | Oct. 11, 1921 |
| 1,947,982 | Gerhardt | Feb. 20, 1934 |
| 2,164,412 | Koster | July 4, 1939 |
| 2,307,840 | MacDonald | Jan. 12, 1943 |
| 2,312,370 | Soule | Mar. 2, 1943 |
| 2,313,480 | Reid | Mar. 9, 1943 |
| 2,326,764 | Crane | Aug. 17, 1943 |
| 2,334,351 | Owens | Nov. 16, 1943 |
| 2,366,603 | Dehmel | Jan. 2, 1945 |
| 2,385,095 | McCarthy | Sept. 18, 1945 |
| 2,385,291 | Link | Sept. 18, 1945 |
| 2,392,781 | Simjian | Jan. 8, 1946 |
| 2,394,062 | Houck | Feb. 5, 1946 |
| 2,410,277 | Farris | Oct. 29, 1946 |
| 2,413,633 | Jones | Dec. 31, 1946 |
| 2,442,297 | Link | May 25, 1948 |
| 2,452,039 | Crane | Oct. 26, 1948 |
| 2,453,436 | Hertz | Nov. 9, 1948 |
| 2,475,314 | Dehmel | July 5, 1949 |
| 2,485,301 | Lowkrantz | Oct. 18, 1949 |
| 2,485,435 | Dehmel | Oct. 18, 1949 |
| 2,492,969 | Crane | Jan. 3, 1950 |
| 2,493,770 | Manning | Jan. 10, 1950 |
| 2,494,508 | Dehmel | Jan. 10, 1950 |

FOREIGN PATENTS

| | | |
|---|---|---|
| 121,205 | Australia | Mar. 18, 1946 |
| 548,093 | Great Britain | Sept. 24, 1942 |
| 575,688 | Great Britain | Feb. 28, 1946 |